United States Patent Office 3,170,797
Patented Feb. 23, 1965

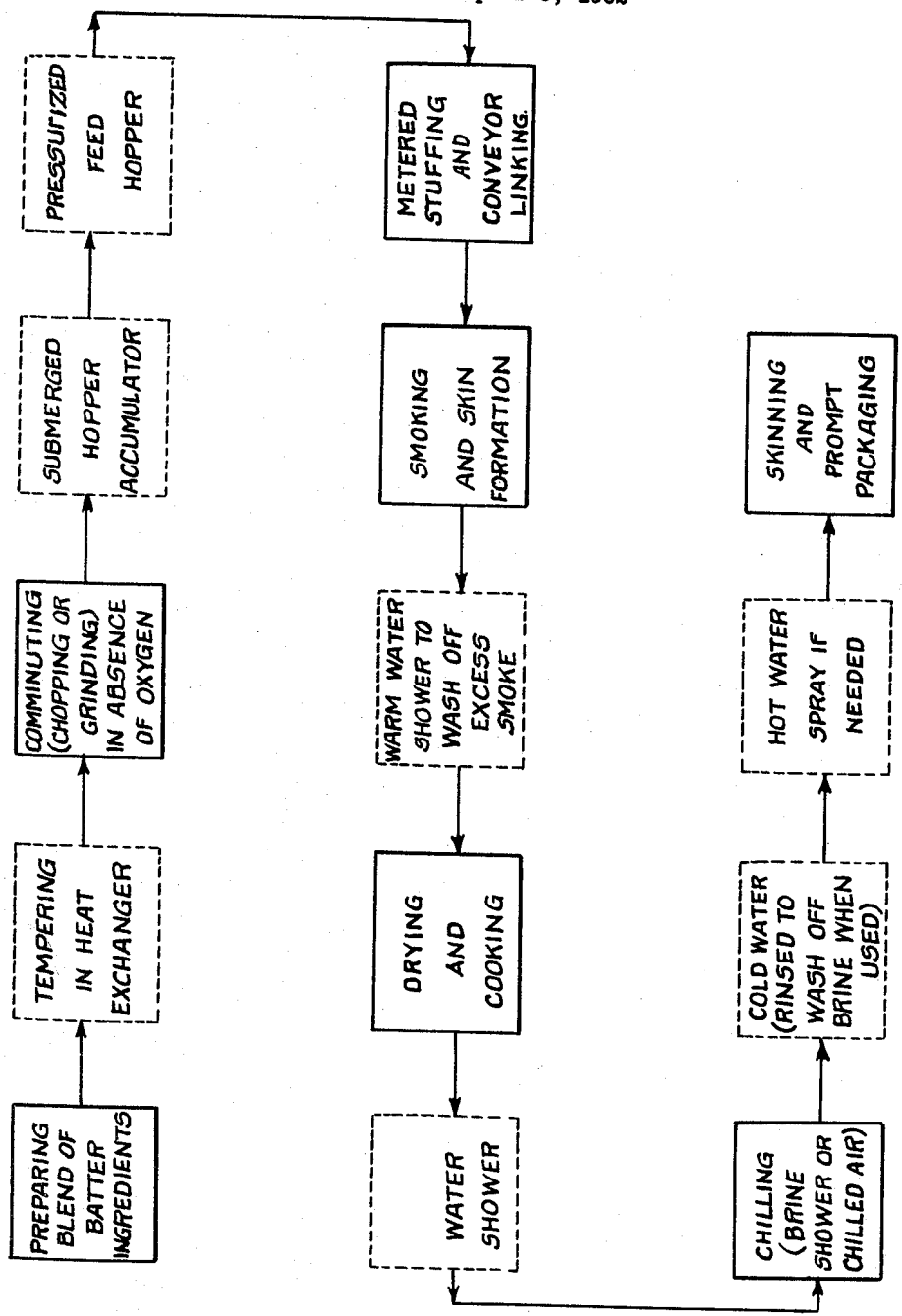

3,170,797
CONTINUOUS MANUFACTURE OF SMALL
SMOKED SAUSAGES
Edward C. Sloan, Madison, Wis., and William B. Ahern, deceased, late of Madison, Wis., by The First National Bank of Madison, Wis., executor, assignors to Oscar Mayer & Co., Inc., Chicago, Ill., a corporation of Illinois
Filed Apr. 5, 1962, Ser. No. 185,476
5 Claims. (Cl. 99—109)

This invention relates, generally, to a continuous, non-manual process of making packaged wiener-size, smoked sausages characterized by their excellent uniformity and keeping qualities. The process itself is characterized by being comprehensive and inclusive in nature in that the first essential step resides in preparing a uniform accurate blend of batter ingredients to a predetermined composition and this is followed down the line by a series of interrelated steps and conditions continuing through to a final packaging step. All of the steps contribute in combination to the end result hermetically packaged wieners characterized by substantially complete uniformity in size, straightness, shape, weight, composition, flavor, texture, color, and by their extra-long shelf life.

While, from the standpoint of its present major commercial importance the invention pertains to innovations and improvements in the processing of wieners since they constitute the largest proportion of smoked sausages manufactured and sold commercially, it also applies to other commercially important, wiener-size smoked sausages such, for example, as those referred to as Smokie Links. These latter contain relatively coarse size particles of ground meat, whereas in wieners the meat is finely chopped. Accordingly, by the term "wiener-size smoked sausages" there are included those smoked sausages that range in diameter from the miniature sizes up to as much as one and one-half inches. The term "comminuting" is used herein to mean particle size reductions broadly including both grinding and chopping.

The art of manufacturing sausages, including wieners and other smoked sausages, is a very old one. In spite of a large number of innovations and improvements which have been proposed, and a number of which have been adopted to advantage, the production of smoked sausages such as wieners and smoked links, has remained essentially an art down through the years to the present time. The conventional procedures are characterized by a series of small independent, batch-type operations, with considerable manual handling and time loss. Heretofore, the innovations and improvements have usually related to individual steps, with little or no relation to the other steps. Instead of being concerned with improvement in just one or two steps or operations in the process of making wieners and similar smoked sausages, the present invention resides in certain related, over-all, combinations of several recent innovations and improvements, commencing with an improved method of accurately blending the sausage batter ingredients, and ending with innovations and improvements in the final packaging operation. While the innovations and improvements that are employed in the present invention appear at the beginning, end and at intermediate places in the over-all processing operation, they combine in a complementary manner to provide a much improved and more efficient process which results in a substantially improved final product characterized by their excellent uniformity in all important respects and prolonged keeping qualities.

Accordingly, the object of the present invention, generally stated, is the provision of an improved continuous-type process for producing packaged wieners, and other wiener-size smoked sausages, wherein such products are efficiently produced and characterized by being highly uniform in size, shape, straightness, weight, color, texture, flavor, composition, and having prolonged keeping qualities when hermetically sealed in packages from which oxygen is excluded.

Another important object of the invention is the provision of such a continuous-type wiener and small sausage-making process wherein the inherently superior features of conventional processes are sufficiently retained while the over-all time lapse between first mixing the ingredients up to and including packaging is materially reduced.

Certain more specific objects of the invention will, in part, be obvious and will in part appear hereinafter.

For a more complete understanding of the nature and scope of the invention reference may now be had to the following detailed description thereof in which typical working examples are set forth and a number of changes or variations therein are described or indicated.

The accompanying drawing is a flow diagram depicting the over-all invention. After describing the invention generally in connection therewith, as applied to the manufacture of wieners, certain variations pertaining to Smokie Link manufacture will be described and illustrative examples will be set forth for both wieners and Smokie Links.

WIENER MANUFACTURE

Referring to the drawing, the first step in the process of making wieners according to the present invention is the preparation of a uniform blend of the batter ingredients. At least several thousand pounds, and preferably in the order of 5,000 to 15,000 pounds, of the wiener batter ingredients (including a small percent of an oxygen scavenger such as ascorbic acid) are blended together so as to form a predetermined composition with respect to the content of moisture, protein, fat, ash, salt and spices. Practical procedures for obtaining such a blend are described in detail in the co-pending application of Kielsmeier and Gara, Serial No. 1,569, filed January 11, 1960, now Patent No. 3,050,399, dated August 21, 1962. A method of continuous blending is also described in said application. In practicing the present invention it is important that a small amount of an oxygen scavenger, e.g. from 0.003% to 0.035% by weight of ascorbic acid, sodium ascorbate, iso-ascorbic acid or sodium iso-ascorbate be incorporated in the various batter formulae. Other soluble ascorbates such as the potassium salts may be used.

This first blending step is a very important one since by having a uniform batter material of predetermined composition to start with, variations are greatly minimized from this standpoint. This is in contrast with conventional wiener processing methods wherein relatively small batches (i.e. less than 1000 pounds) are prepared according to recipes without determinations being run and adjustments made for variations in protein, fat and moisture content. As a result there are appreciable variations from batch to batch and such variations give rise to other variations during later processing steps in the conventional process and lead to inevitable variations in the final product.

Typically, the wiener batter blend after preparation according to the process described in Kielsmeier and Gara, Patent 3,050,399, will have a temperature from about 28° F. to 40° F. For improved chopping it is usually desirable to raise the temperature to from about 40° F. to 55° F. This may be done in a tempering operation wherein the blend of batter ingredients is pumped, as by means of a Moyno pump, through a heat exchanger of known type, with warm water being used as the heating liquid. Since this step is optional, it is indicated in the drawing in broken outline, as are certain other optional steps which will be referred to below.

As introduced into the blending step the ingredients for the batter need only be ground sufficiently so that they can be mechanically blended to yield a uniform mixture. For example, grinding through plates having ¼ inch openings will suffice. In order to comminute the blend much more finely by chopping, and convert it to a sausage emulsion suitable for stuffing, the tempered blend is continuously conveyed into a continuous chopper of known type. A preferred chopper is the one shown and described in detail in co-pending application Serial No. 27,105 of Edward Schmook, Jr., filed May 5, 1960, now Patent No. 3,095,022, dated June 25, 1963. This chopper may be operated under vacuum so that, as the ingredients pass therethrough, they are both chopped and de-aerated. Alternately, an inert gas such as nitrogen amy be continuously introduced into the chopper so that the chopping is done in the absence of air. After passing through the continuous chopping step, the chopped emulsion is continuously collected and is ready to be stuffed into the casings.

A preferred means for collecting and feeding the chopped sausage emulsion to the stuffing apparatus is a so-called submerged hopper accumulator, a preferred form of which is described in co-pending application Serial No. 52,428 of Edward Schmook, Jr., filed August 29, 1960, now Patent No. 3,107,392, dated October 22, 1963. This device provides a means for collecting and retaining out of contact with the atmosphere or air a relatively small, but adequate, quantity (e.g. from 20 to 150 pounds) of the sausage emulsion on its way from the continuous chopper to the stuffing apparatus. This quantity is relatively small compared with the weight of the initial blend but is sufficient to continuously feed the stuffer. The sausage emulsion may be withdrawn from the submerged hopper accumulator and fed to the stuffing apparatus in which it is metered under uniform pressure into casings of uniform diameter which are fed at a predetermined speed. Uniform pressurized feed may be provided by a batter pump, such as a Moyno pump, or by a closed pressurized feed hopper wherein the head space is filled with air or an inert gas such as nitrogen, and the level of the batter is controlled so as to maintain a continuous supply of the emulsion. The pressure on the emulsion may be controlled in the range of 25 to 125 pounds per square inch gauge. The metering may be accomplished by means of metering pumps, which, when driven at a constant speed and supplied with the emulsion at the constant pressure, serve to deliver a metered flow of the emulsion. Preferably the casing feed is driven from the same power source as the metering pump so that feeding the casing and the emulsion are positively synchronized. One suitable type of metering pump and associated casing feeder and stuffing horn is shown and described in Millenaar and Blair application Serial No. 185,167, filed April 4, 1962, now Patent No. 3,166,784 dated January 26, 1965. The casings (e.g. so-called Visking casings) may be 50 feet long or longer depending on availability. As the casings are stuffed, they are continuously linked on conveyorized linking bars whereby each link is identical in length and individually supported in straight condition. Conveyorized linking apparatus for accomplishing this type of linking is disclosed in co-pending application Serial No. 786,168, of Richard J. Millenaar, filed January 12, 1959, now Patent No. 3,059,272 dated October 23, 1962.

Wiener emulsion, and other wiener-like sausage emulsions wherein the ingredients are finely chopped, contain elongated fibers which can, desirably, be oriented during stuffing so as to impart desired texture and strength properties to the wieners as described in co-pending application Serial No. 178,922 of Sloan et al., filed March 12, 1962. This application also discloses a special stuffing horn to provide the desired orientation in a controlled manner.

The metered stuffing operation is located immediately adjacent the entrance end of a processing tunnel in which the stuffed and linked product is smoked, heat processed and cooled or chilled. The conveyorized linking means serves to convey the linked product through the tunnel. A conveyorized processing tunnel of this general type is illustrated and described in said Patent 3,059,272. In that apparatus the stuffed product is linked as part of the step of inserting or depositing the stuffed casing onto a continuous conveyor, carrying transverse linking bars, which travels through a processing tunnel. Each sausage link is entirely exposed, being supported only at its opposite pinched ends. The stuffed and linked product enters the tunnel at the entrance to the first zone wherein the product is subjected to intense smoking and skin formation treatment. In general, the denser the smoke the better, and furthermore, the smoke should be circulated so that fresh quantities of smoke are continually brought into contact with the product as it is conveyed in a tortuous path therethrough. The smoking operation under the above conditions can be carried out in about 5 to 10 minutes with gaseous smoke, and if 'liquid smoke" is used the time may be reduced to as short as ½ minute. The smoke serves not only to give the smoke flavor to the product, but it also brings about the skin formation on the meat emulsion just under the artificial casings. This skin formation is important since, it permits the casings to be readily removed or stripped before the product is packaged, gives the product the desired natural appearance, and provides it with an edible outer layer which gives the necessary strength for packaging and handling. Generally speaking, the skin formation is the controlling factor in smoking since this must develop to a certain minimum in order that the casings may be removed. When adequate skin formation occurs, the product will usually have acquired an adequate smoke flavor. If the smoke flavor is too strong, then some of the smoke may be washed off so as to reduce the intensity of the flavor as desired.

In order to obtain uniformity of product it is necessary to maintain substantial uniformity of the smoke and its application. The density of the smoke is controlled by the operation of the smoke generating equipment with the rate of sawdust feed being the main variable to control smoke out-put. The sawdust feed may be automatically controlled in response to the signals put out by a smoke metering device of known type including a monitoring cell through which the smoke atmosphere is continuously circulated.

Instead of using a smoking atmosphere supplied with smoke from a generator of known type fed with sawdust, so-called "liquid smoke" may be used. Various liquid smoke preparations are known and available which can be made up into standardized solutions and applied to the product by spraying thereon at uniform temperatures and for uniform times. After being sprayed with the smoke solution, the wieners are showered with warm water to wash off excess smoke.

After smoking (either by gaseous smoke or in solution), there follows a zone, and preferably a series of zones, in which the smoked product is subjected to a combination drying and cooking treatment. The requisites for this treatment are rapid circulation or flow of heated unsaturated air over all surfaces of the product. This treatment under these conditions should last for about 20 to 30 minutes during which time the internal temperatures of the product is raised up to at least about 160° F.

The following table gives satisfactory ranges in tunnel conditions:

TABLE 1

|  | Smoke Zone | Drying and Cooking Zones | Water Shower | Brine Shower |
|---|---|---|---|---|
| Dry Bulb, °F | 90–160 | 100–240 | 50–90 | 5–15 |
| Wet Bulb, °F | 80–140 | 90–200 | | |
| Time in Zone (minutes) | 1/2–10 | In all zones 20–30 | 1–5 | 5–10 |
| Internal Temp. on Leaving | 75–125 | 160–200 | 80–120 | 30–60 |

After the drying and cooking portion of the process has been completed, the relatively hot product is usually cooled or chilled prior to skinning, i.e. stripping off the artificial casing. The cooling or chilling makes the individual sausages mechanically stable for handling after skinning and before packaging. As indicated in the drawing, there may be several different procedures used in accomplishing this cooling and chilling phase of the improved sausage manufacturing operation. As a matter of economy from the standpoint of refrigeration expense, it is usually desirable to first spray the cooked wieners with a shower of water. Following this, the wieners are chilled either by showering them with cold brine or subjecting them to a blast of chilled air. If brine is used then it is desirable to follow with a cold water rinse to wash off residual brine. A hot water spray may or may not be needed immediately following the chilling of the product prior to skinning and stripping.

The product leaves the exit opening of the tunnel after the final water spray and the links are automatically released from their supporting bars and immediately delivered to continuous skinning or stripper machines of known type, for example, the skinning machine shown in Patent No. 2,686,927, granted August 24, 1954, to V. A. Grey.

The skinned product is promptly packaged, preferably in hermetically sealed, oxygen-free packages, either by being vacuumized or by being both vacuumized and backfilled with an inert gas (e.g. nitrogen). An excellent procedure and apparatus for packaging the wieners in hermetically sealed, oxygen-free, transparent film material such as saran film is shown and described in Sloan et al. application, Serial No. 61,993, filed October 11, 1960, now Patent 3,129,545 dated April 21, 1964.

SMOKIE LINK MANUFACTURE

Smokie Link type sausages may be manufactured in generally the same overall manner described above in connection with the manufacture of wiener sausages, but with certain changes being introduced therein. Thus, after the Smokie Link batter of controlled composition (including a small percent of an oxygen scavenger such as ascorbic acid) is prepared, it is ground (without preliminary warming) in the absence of oxygen and maintained under vacuum or in the presence of an inert gas until it is stuffed into the casings. After grinding the meat particles are much coarser than they would be if chopped. A very satisfactory apparatus for both grinding, accumulating and feeding the ground Smokie Link batter either directly to the stuffing apparatus or to a pressurized feed hopper used for feeding the stuffing apparatus, is disclosed in Sloan application Serial No. 95,703, filed March 14, 1961, now Patent No. 3,147,784 dated September 8, 1964.

After metered stuffing the manufacture of Smokie Links follows generally the foregoing procedure described for wiener manufacture except that no effort is made to orient the fibers during stuffing, as is desirable in the case of wieners.

Wieners or Smokie Links, or variations of these two types of small smoked sausages, may be produced in accordance with the above general processes which are characterized by each individual wiener or Smokie Link in a given product run or lot, or a series of runs or lots, being substantially identical in respect to size, shape, complete straightness, weight, color, flavor, texture and composition. By reason of these high uniformity, to the point of being practically identical, of the individual sausages with regard to their physical dimensions and straightness, it is possible to package the wieners or Smokie Links so that the resulting packages are in and of themselves highly uniform to the point of also being substantially identical for all practical purposes.

The following examples will serve further to disclose the nature and process of the invention although it will be understood that these examples are illustrative only and are not intended to be limiting in any way.

*Example 1 (wieners)*

A blend of wiener batter ingredients is prepared in accordance with Example 2 of said Kielsmeier and Gara Patent 3,050,399 with 0.03% ascorbic acid being included in the initial mixture.

This prepared batter blend having a temperature of approximately 38° F. is pumped from the mixer in which it is prepared, continuously through a heat exchanger operated so as to give a batter discharge temperature of approximately 43° F. From the heat exchanger the tempered batter is continuously pumped into the feed connection of a continuous chopper of the type shown in said Schmook application Serial No. 27,105, now Patent No. 3,095,022. The vacuum connection of this chopper is connected with a source of vacuum having approximately 27 inches of mercury so that the chopped batter is efficiently deaerated. The chopped batter, i.e. wiener emulsion, continuously discharges from the rotary chopper into the submerged hopper accumulator of the type shown and described in the said Schmook Patent 3,107,392. The wiener emulsion is withdrawn through the outlet connections of the bottom of such submerged hopper accumulator by means of a Moyno pump and continuously discharged at the rate of about 50 pounds per minute into an enclosed hopper having a free-board or head space pressurized to 50 pounds per square inch with air or nitrogen gas. The wiener emulsion is discharged from this pressurized enclosed hopper into the header pipe feeding a series of metering pumps of the stuffing apparatus as shown and described in Millenaar et al., Patent No. 3,166,784.

The conveyorized linking bars were set to travel at a speed of 21 feet per minute so as to carry the linked product through the processing tunnel, from entrance to discharge, in 39 minutes. The operating conditions within the tunnel may be maintained as follows:

TABLE 2

|  | Smoke Zone | Drying and Cooking Zones | | | | | | Cold Water Shower | Brine Shower |
|---|---|---|---|---|---|---|---|---|---|
|  |  | 1 | 2 | 3 | 4 | 5 | 6 |  |  |
| Dry Bulb, °F | 105 | 105 | 130 | 155 | 180 | 200 | 220 | 60 | 15 |
| Wet Bulb, °F | 100 | 100 | 115 | 120 | 130 | 140 | 150 | | |
| Time in Zone (minutes) | 7 | 2 | 4 | 4 | 4 | 4 | 5 | 2 | 7 |
| Internal Temp on Leaving | 90 | 90 | 105 | 123 | 145 | 160 | 170 | 100 | 55 |

The product discharging from the tunnel was continuously fed to a set of continuous strippers, there being a stripper for each parallel line of stuffed and linked casings conveyed through the tunnel by the conveyorized linking bars. The stripped wieners were immediately transferred to a continuous packaging machine wherein they were continuously packaged, ten wieners to a package, in supercooled saran as shown and described in the said Sloan et al., Patent No. 3,129,545. These packages under ordinary refrigeration will keep in excellent condition for up to 16 weeks.

*Example 2 (Smokie Links)*

A blend of Smokie Links batter ingredients is prepared in accordance with Example 2 of said Kielsmeier and Gara Patent 3,050,399 with 0.03% ascorbic acid being included in the initial mixture. This prepared batter blend having a temperature approximately 35° F. is pumped from the mixer in which it is prepared through a grinding, accumulating and feeding apparatus corresponding to that disclosed in said Sloan Patent No. 3,147,784. The finished ground batter is then fed through metering pumps (e.g. of the Moyno type) into casings for sizing and processing. The same type of conveyorized tunnel, stripping and packaging equipment as described above in connection with Example 1 may also be used in the processing of the Smokie Links after stuffing and conveyorized linking. Furthermore, the times, speeds and other conditions utilized in connection with the manufacture of wieners in Example 1 may also be used in the manufacture and processing of Smokie Links.

When it is desired to manufacture an artificially colored product such as colored wieners, then either dyed casings of known type may be used or an approved dye may be incorporated in part of the water used in the processing of the product as it passes through the conveyorized tunnel.

It will be understood that the foregoing examples are illustrative and that various changes may be made therein and other embodiments of the invention may be practiced as long as the essential steps in the overall procedure are used as set forth above.

What is claimed as new is:

1. The substantially continuous process of making packaged wiener-sized smoke and heat processed sausages characterized by their substantially complete uniformity in size, straightness, shape, weight, composition, flavor, texture, color and good keeping qualities which comprises the steps of: preparing a uniform blend of sausage batter ingredients having an accurate predetermined composition with respect to its content of moisture, protein, fat, ash, salt and spices and including a fraction of a percent of an oxygen scavenger; comminuting said blend in the absence of appreciable amounts of oxygen to form sausage batter; maintaining said batter substantially out of contact with air and stuffing it as a metered stream into artificial casings of uniform diameter fed at predetermined uniform speed; linking the stuffed casings into links of uniform length and individually supporting the links as formed and during the subsequent smoking and heating processing steps on conveyorized link-forming and supporting means; conveying the linked product at predetermined speed through a multi-zone processing tunnel wherein the product passes through at least one smoking and skin-forming zone in which the surfaces of the linked product are uniformly treated with a smoke-containing fluid and then through at least one cooking and drying zone wherein heated unsaturated air is circulated past the product so as to substantially raise the internal temperature thereof and dry the exterior thereof; removing the product from said supporting means; and skinning the product to remove said casing therefrom.

2. The substantially continuous process of making packaged wiener-sized smoke and heat processed sausages characterized by their substantially complete uniformity in size, straightness, shape, weight, composition, flavor, texture, color and good keeping qualities which comprises the steps of: preparing a uniform blend of sausage batter ingredients having an accurate predetermined composition with respect to its content of moisture, protein, fat, ash, salt and spices and including a fraction of a percent of an oxygen scavenger; comminuting said blend in the absence of appreciable amounts of oxygen to form sausage batter; maintaining said batter substantially out of contact with air and stuffing it as a metered stream into artificial casings of uniform diameter fed at predetermined uniform speed; linking the stuffed casings into links of uniform length and individually supporting the links as formed and during the subsequent smoking and heating processing steps on conveyorized link-forming and supporting means; conveying the linked product at predetermined speed through a multi-zone processing tunnel wherein the product passes through at least one smoking and skin-forming zone in which the surfaces of the linked product are uniformly treated with a smoke-containing fluid and then through at least one cooking and drying zone wherein heated unsaturated air is circulated past the product so as to substantially raise the internal temperature thereof and dry the exterior thereof; removing the product from said supporting means; skinning the product to remove said casing therefrom; and, promptly packaging the skinned product in evacuated and sealed packages formed of a transport film material having oxygen and moisture barrier properties.

3. The process of claim 2 wherein after said sausages are cooked and dried in said tunnel they are chilled so as to render them dimensionally stable prior to removal from said tunnel.

4. The process of claim 2 wherein from about 0.003 to 0.035% by weight of a compound selected from the group consisting of ascorbic acid, iso-ascorbic acid and soluble salts thereof is used as said oxygen scavenger.

5. The substantially continuous process of making packaged wieners characterized by their substantially complete uniformity in size, straightness, shape, weight, composition, flavor, texture, color and good keeping qualities which comprises the steps of: preparing a uniform blend of wiener batter ingredients having an accurate predetermined composition with respect to protein, fat and water contents, and including a fraction of a percent of an oxygen scavenger; adjusting the temperature of said blend to from about 40 to 55° F.; chopping said blend in the absence of appreciable amounts of oxygen so as to form a batter suitable for stuffing; maintaining a pressurized supply of said batter; stuffing artificial sausage casings of uniform diameter fed at predetermined speed with a metered stream of said batter released from said pressurized supply; linking the stuffed casings into links of length which are individually supported at their opposite ends only on conveyorized link-forming and supporting means; conveying the linked product at predetermined uniform speed through a processing tunnel wherein the product (1) passes in not more than 10 minutes through at least one smoking and skin-forming zone in which the surfaces of the linked product are uniformly treated with smoke having a dry bulb temperature in the range of about 90–180° F., a wet bulb temperature in the range of about 80–140° F. and an internal temperature on leaving in the range of about 75–125° F., (2) passes in about 20 to 30 minutes through a plurality of cooking and drying zones wherein heated unsaturated air is rapidly circulated past the product so as to dry the exterior thereof and raise the internal temperature thereof to from about 160–200° F., and (3) passes through product cooling and chilling zones wherein the internal temperature is reduced to from about 30–60° F.; removing the product from said supporting means; skinning the product to remove said casing therefrom; and promptly packaging the skinned product in evacuated and sealed packages formed of a transparent film material having oxygen and moisture barrier properties.

References Cited in the file of this patent

UNITED STATES PATENTS

| | | |
|---|---|---|
| 2,681,279 | Sloan et al. | June 15, 1954 |
| 2,760,868 | Thommen | Aug. 28, 1956 |
| 2,964,409 | Sair | Dec. 13, 1960 |
| 2,973,277 | Barnett et al. | Feb. 28, 1961 |
| 3,050,399 | Kielsmeier et al. | Aug. 21, 1962 |
| 3,092,499 | Gretler et al. | June 4, 1963 |

UNITED STATES PATENT OFFICE
CERTIFICATE OF CORRECTION

Patent No. 3,170,797                             February 23, 1965

Edward C. Sloan et al.

It is hereby certified that error appears in the above numbered patent requiring correction and that the said Letters Patent should read as corrected below.

Column 3, line 31, for "amy" read -- may --; column 4, line 36, for "if 'liquid smoke" is" read -- if "liquid smoke" is --; column 6, line 7, for "product" read -- production --; column 8, line 34, for "transport" read -- transparent --.

Signed and sealed this 17th day of August 1965.

(SEAL)
Attest:

ERNEST W. SWIDER                              EDWARD J. BRENNER
Attesting Officer                                   Commissioner of Patents